(12) United States Patent
Ferrari (10) Patent No.: US 10,717,160 B2
(45) Date of Patent: Jul. 21, 2020

(54) ENHANCED ONSITE TRUCK AND TRAILER REAR AXLE SPINDLE REPLACEMENT SYSTEM AND METHOD

(71) Applicant: William J. Ferrari, Pittsburgh, PA (US)

(72) Inventor: William J. Ferrari, Pittsburgh, PA (US)

(*) Notice: Subject to any disclaimer, the term of this patent is extended or adjusted under 35 U.S.C. 154(b) by 0 days.

(21) Appl. No.: 16/686,072

(22) Filed: Nov. 15, 2019

(65) Prior Publication Data

US 2020/0078885 A1 Mar. 12, 2020

Related U.S. Application Data

(63) Continuation-in-part of application No. 15/219,181, filed on Jul. 25, 2016.

(51) Int. Cl.
*B23K 37/04* (2006.01)
*B23P 6/04* (2006.01)
*B23K 37/053* (2006.01)

(52) U.S. Cl.
CPC ...... *B23K 37/0443* (2013.01); *B23K 37/0538* (2013.01); *B23P 6/04* (2013.01)

(58) Field of Classification Search
None
See application file for complete search history.

(56) References Cited

U.S. PATENT DOCUMENTS

| | | | | |
|---|---|---|---|---|
| 2,736,286 A * | 2/1956 | Britton | ............... | B23K 37/0536 269/48.1 |
| 3,400,872 A * | 9/1968 | Rogers | ............... | B23K 37/0533 228/44.5 |
| 3,691,642 A * | 9/1972 | Nolte | ............... | G01B 5/25 33/193 |
| 4,413,765 A * | 11/1983 | Tracy | ............... | B23K 37/0533 138/97 |
| 4,792,080 A * | 12/1988 | Ferrari | ............... | B23K 37/0443 228/49.3 |
| 4,942,667 A * | 7/1990 | Fournier | ............... | G01B 11/275 33/228 |
| 5,125,146 A * | 6/1992 | Ferrari | ............... | B23K 37/0443 29/402.08 |
| 7,941,935 B2 * | 5/2011 | Khan | ............... | G01B 5/255 33/288 |
| 9,827,636 B2 * | 11/2017 | Tsui | ............... | B23K 37/0536 |

(Continued)

*Primary Examiner* — Devang R Patel
(74) *Attorney, Agent, or Firm* — Gary P. Topolosky (57) ABSTRACT

A system for enabling replacement of a properly aligned, full floating, tubular rear spindle on an existing truck and trailer axle for welding without machining. The improvement of this system uses a first alignment plate for positioning about and partially beyond the beveled cut edge of the truck trailer axle with a plurality of spaced outrigger assembly clamps and a plurality of hold down fixture clamps. It uses an improved rocket ship jig having a recessed inner plate for positioning over the plurality of axial spacer sleeves, at least one of said spacer sleeves including a brake bolt. The system (and related methods) enable better three-dimensional positioning and centering up of replacement parts before welding. New outriggers using studs and nuts enable tilt movements, both up-and-down and axial (in-and-out) movements before welding.

9 Claims, 7 Drawing Sheets

(56) References Cited

U.S. PATENT DOCUMENTS

2006/0143893 A1* 7/2006 Ebert ..................... B23B 3/24
                                                    29/402.01
2015/0174706 A1* 6/2015 McClure ............ B23K 37/0533
                                                     269/45

* cited by examiner

ENHANCED ONSITE TRUCK AND TRAILER REAR AXLE SPINDLE REPLACEMENT SYSTEM AND METHOD

CROSS-REFERENCE TO RELATED APPLICATIONS

This is a continuation-in-part of concurrently revived application Ser. No. 15/219,181 filed on Jul. 25, 2016, the disclosure of which is fully incorporated by reference herein.

STATEMENT REGARDING FEDERALLY SPONSORED RESEARCH OR DEVELOPMENT.

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

None other than the above-captioned parent application, now revived.

BACKGROUND OF THE INVENTION (1) Field of the Invention

This invention relates to vehicular axle repair methods and apparatus/systems relating to the same. They are intended as further advancements from Applicant's original disclosures in his U.S. Pat. Nos. 4,792,080 and 5,125,146. It should be noted, however, that the latter patent was primarily designed for drive axle repair whereas this invention's focus is on a system and method for truck and trailer rear axle spindle replacement. These improvements are applicable to trailer axle repairs and certain drive axles with welded on brake spiders. They are specially suited for performing a truck axle spindle replacement at the actual axle failure site.

(2) Description of Related Art Including Information Disclosed Under 37 CFR 1.97 and 1.98

This system is an improvement over Applicant's earlier patented method for replacing rear axle spindles as shown in U.S. Pat. No. 5,125,146. This enhanced system has more adapters for fitting newer vehicles. The equipment is for a new, much improved alignment system that makes it easier for just one person doing this type of work to properly align the parts being replaced (rather than repaired) in situ, i.e., out on the road and not in a typical repair shop. Applicant makes no claims for using this new equipment for doing other jobs only replacing spindles on full floating spindles that are tubes, i.e., NOT solid shafts. Such tubular spindles are on trucks ¾ ton and larger, RV's, semi trailers and off road equipment, and other similar sized/type vehicles.

When a truck, trailer or any type of vehicle has a bearing failure on a full floating axle and damages the spindle, it is very expensive to replace the axle . . . with a lot of downtime. A person skilled at welding and using the equipment of this invention can complete such repairs, via full replacement, in most cases the next day and with no machining.

What separates Applicant's equipment from his competitors is that with the present invention, there is NO need for machining or boring the axle housing out to remove metal from inside of the axle housing to get that inside round. Such machining/boring makes the resultant axle housing weaker. The competitors then cut holes in those housings and insert the spindles (and other parts) into the weaker parts of those housings. They claim to make parts better than new and/or make it easier to replace the spindles because they are screwed into parts inserted into the machined/bored housing that were done wrong in the first place.

To understand what separates Applicant's invention from his competitors is to understand how such axles are manufactured. The larger percent of axle with spindles that are "full floating" are fabricated out of steel with all of the parts making up the axle being welded. The tubular spindles are then butt welded to that axle. With butt-welding, these one-piece spindles maintain their strength and flexibility. Such manufacturing means have been used to fabricate axle housings of these types for decades.

The steel axles on your average, everyday truck, trailer and/or others vehicle make up the larger percentage of axles on the road. There is still a small percent of axles on some trucks and buses that have inserted spindles, such spindles being pressed into a heavy cast steel housing. Unlike steel parts that are pressed into their housings, such pressed steel parts can flex and not have the holding power as cast steel or cast iron. That is why one should not insert spindles into those housings.

The enhanced on-location (i.e., off site, roadside) system of this invention can replace tubular spindles on steel full floating axles in much the same way that they were originally manufactured. The most important part of doing this type of work is a one-piece spindle that maintains its proper alignment.

When Applicant is on the job (in the field or at an off-site, roadside repair site) using the correct spindles, he first saws off the damaged spindle and grinds a bevel on the housing. Next, he attaches re-alignment equipment on the housing, checks all measurements and clamps on his jig fixture that holds the spindles onto the alignment plate. Then he checks the measurements once more before stitch welding the spindles onto the housing. After checking the measurements yet again, he removes the alignment equipment and finishes welding using engineering techniques to eliminate any stress and maintain the alignment. The equipment of this invention makes that job much easier, maintains alignment and helps the repairer achieve strengths more consistent with the way the parts were originally manufactured.

This invention addresses an improvement over known methods and devices for usually just repair truck and trailer drive axles, especially those having one or more brake spider welded to them. This improvement uses a plurality of studs, rather than just C-clamps for holding the parts together for welding. This improvement further includes a rocket ship jig brake bolt for better stabilization when aligning all the components prior to welding. And for the replacement of drive axles, this invention uses an adapter plate and plurality of adapter bushings/spacers that enable self-centering. This is especially useful for newer trucks and trailers that are: using disc brakes or mainly designed for drum brakes.

This invention employs new adapter plates with holes that match the bolt patterns for smaller trucks for a newer housing configuration. In one embodiment, it makes the parts automatically "parallel" for welding purposes for better welding alignments. The adapter plate automatically squares up and then gets clamped or bolted to the machined flange. And now, the rocket ship jig is meant to clamp on only after the adapter plate for the trailer axle is manually aligned at three to four different locations.

BRIEF SUMMARY OF THE INVENTION

This invention addresses an improved system that uses a welded jig to temporarily hold a replacement terminal portion in place with respect to the remainder of an axle, until the terminal portion has been partially welded to the remainder of the axle at the joint between them. That welded jig is composed of two inner adapter bushings made of aluminum and held together by three struts of the rocket ship welded between them. The adapters are of a size appropriate for fitting on the inner and outer bearing surfaces of the axle made of steel. The terminal portion is initially welded to the remainder of the axle through the access to the joint provided by the spaces between the struts. The jig is then removed and the finish welding completed.

It is an object of this invention to provide the best solution suitable for axle replacement where more than the outer bearing surface has been damaged. It is another object to enhance the devices and methods used for replacing (rather than just repairing) trailer axles and some drive axles with welded brake spiders.

In this invention, an alignment plate or platform is provided which has means for adjusting its location with respect to the axis of the vehicle axle. The alignment plates assist with setting a proper camber and toe. The alignment means include clamping a first alignment plate to a first jig element and affixing a second alignment plate at an opposed end.

With this enhancement, one will only need a measuring tape for locating the alignment platform with respect to the trailer axle, drive axle or both types. When the alignment platform is properly situated, a replacement part is properly held in place for welding. It represents a time and labor savings when effecting a welding repair to a vehicular (truck or automotive) axle. Prior welding alignment means included adding a crude locator stick on the end opposite undamaged spindle around to the other side, moving back and forth about the whole length of a set up axle for repair (could be six to eight feet in length) and then still sometimes visually estimating alignment with that locator stick before the welding repair commences. This method results in a more accurate axle replacement than was previously known or practiced.

DETAILED DESCRIPTION OF THE INVENTION

Figure 1:
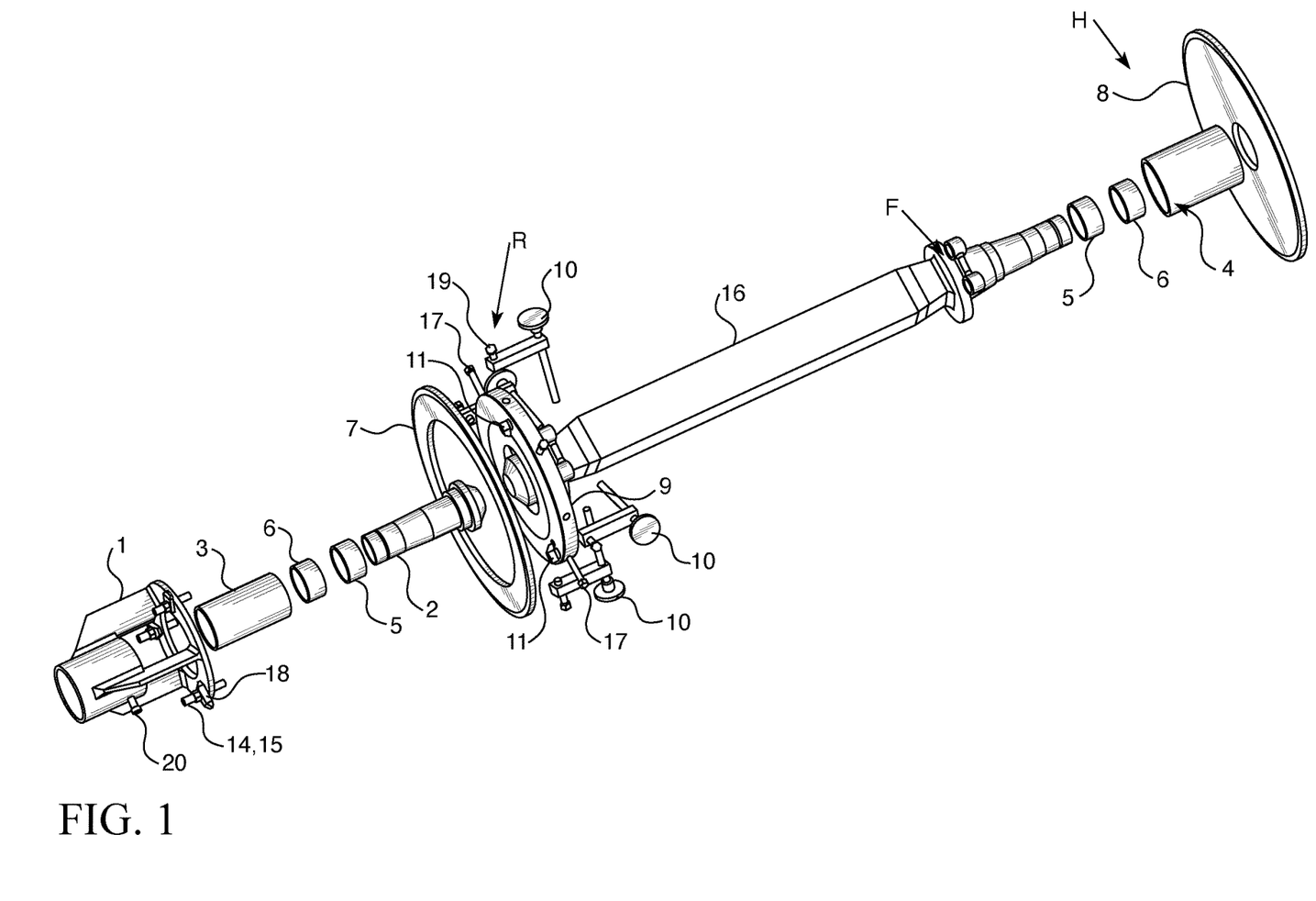
FIG. 1 is an exploded front perspective view of a trailer axle jig with the rocket ship aligning tool installed onto the leftmost end of the trailer axle jig for replacing per the method of this invention.
Figure 2:
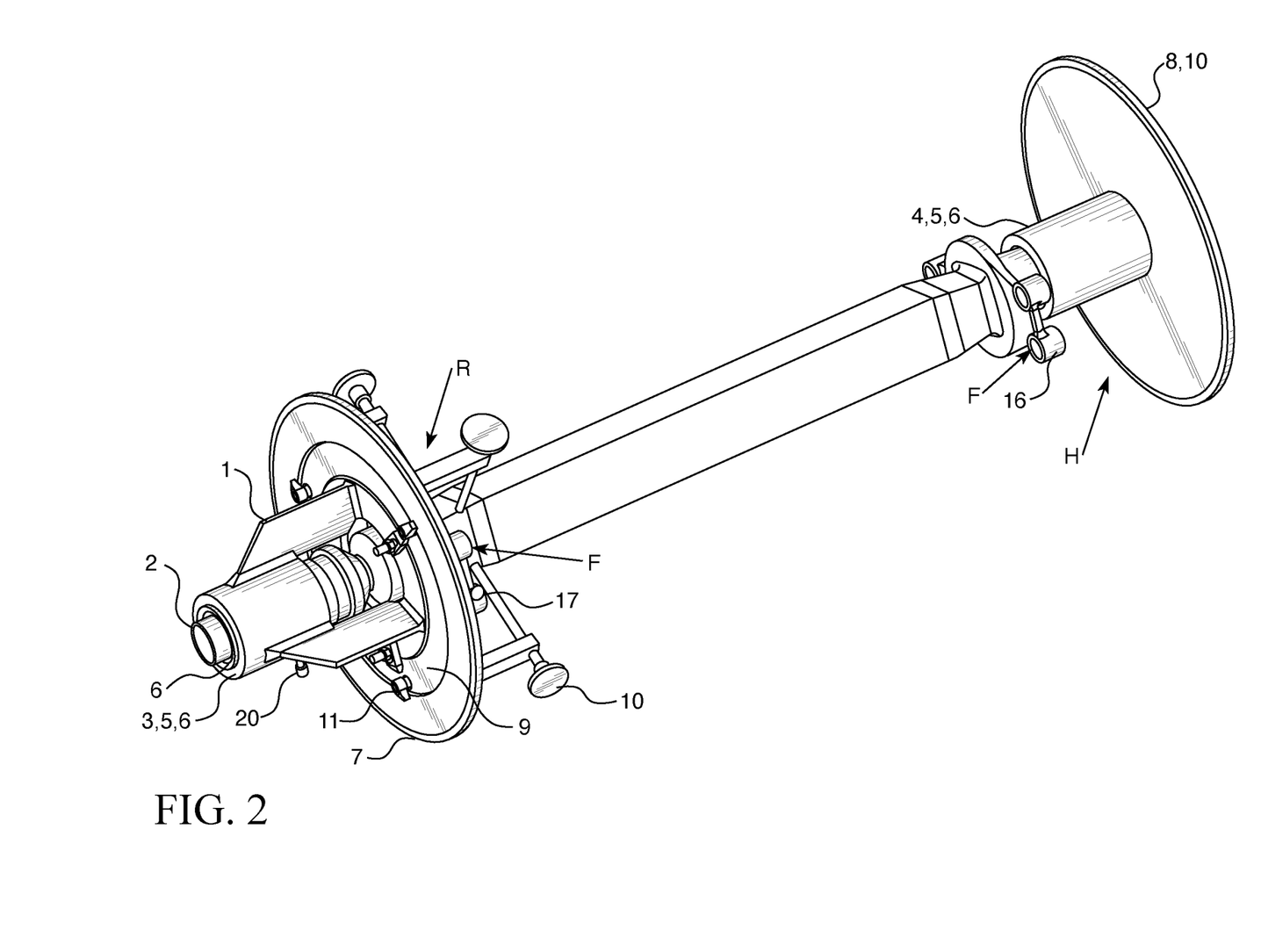
FIG. 2 is a front perspective view of the trailer axle jig and rocket ship from FIG. 1 assembled altogether.
Figure 3:
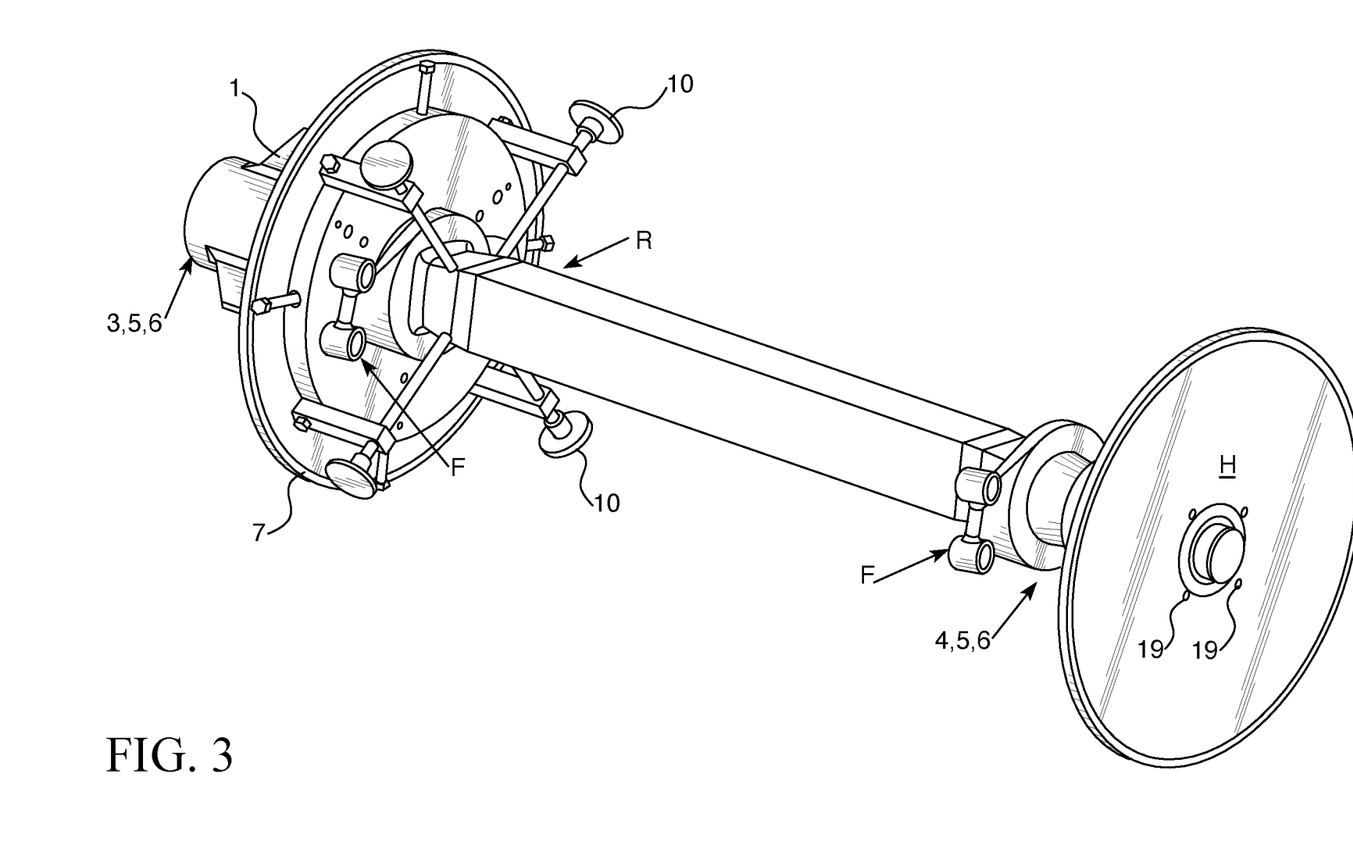
FIG. 3 is a rear perspective view of the fully assembled trailer axle jig and rocket ship from the reverse angle shown in FIG. 2.

FIGS. 1 through 3 illustrate a first use of this invention for trailer axle replacement. The respective part numbers as illustrated for this trailer axle jig arrangement are as follows:

| Item No. | Quantity | Description |
| --- | --- | --- |
| 1 | 1 | ROCKET SHIP JIG |
| 2 | 1 | SPINDLE |
| 3 | 1 | SLEEVE |
| 4 | 1 | SLEEVE |
| 5 | 2 | JOURNAL ADAPTER SLEEVE |
| 6 | 2 | JOURNAL ADAPTER SLEEVE |
| 7 | 1 | MEASURING PLATE |
| 8 | 1 | MEASURING PLATE |
| 9 | 1 | FULL SPINDLE ALIGNMENT PLATE |
| 10 | 4 | OUTRIGGER ASSEMBLY |
| 11 | 3 | HOLD DOWN SWIVEL CLAMP |
| 14 | 3 | HOLD DOWN STUD |
| 15 | 3 | HEX NUT |
| 16 | 1 | EXISTING TRAILER AXLE |
| 17 | 4 | ADJUSTING STUD |
| 18 | 3 | MACHINE CLAMP |
| 19 | 4 | HEX BOLTS |
| 20 | 1 | CAP/SET SCREW/SPINDLE BRAKE |

Prior to this invention, trailer axle jigs had no outside clamping mechanisms. The swivel clamps of this arrangement, by contrast, hold the jig with its recessed plate for better alignment with gauges for more accurate, ideal proper positioning. The latter lets one operator, alone, by him or herself, align the two ends in a weld repair situation, i.e., the replacement spindle end R versus the opposed hub and spindle nut end H.

Such alignment plates attach to the thread and journal jig components of this set of axle repairing improvements. One alternative to the use of a laser aligner would be an implementable, manual measuring device/separator such as a retractable measuring tape or tape roller (not shown).

Another inventive aspect as shown in FIGS. 2 and 3 concerns the addition of at least one set screw 20 along the slotted sleeve of this new and improved rocket ship jig. These set screws serve to act as a pseudo spindle "brake".

The same improvements for the foregoing trailer axle, particularly the use of rocker clamps, and a spindle brake (i.e., the added "window") help improve the repeated manufacture (virtually every time one is needed) of a customized axle jig according to alternate embodiments of this invention.

In FIGS. 1 through 3, the system and method are shown for replacing (not just repairing) spindles with a welded brake spider on the trailer axle. First, the damaged spindle is measured and marked for where to cut probably with a band saw (not shown) before being beveled with a hand grinder for subsequent welding.

Next, the jig fixture 1 and first sleeve 3 are positioned relative to the replacement spindle 2 with the outer bearing bushing 6 and inner bearing bushing 5 fitted onto spindle 2. Note that sleeve 3 is preferably the same size on the inside of the outer bushing 6, and the inside to the jig fixture 1 is the same size as the outside of sleeve 3. All of the foregoing are then brought together in the jig fixture 1.

The main spindle alignment plate 9 is clamped onto axles having a welded brake spider flange F (i.e., most trailer axles like in FIG. 1, and also some drive axles). These flanges are machined at the same time as the spindle when first manufactured. Before that damaged spindle is cut away and beveled for welding, the flange is meant to make the alignment plate square with the spindle. However, the alignment plate is clamped on using measuring plate 8, four such clamps with 3 in. studs are threaded into the back of measuring plate 9, the main alignment plate. They are then attached to the brake spider flange on the axle housing with the milling machine clamps using the 0.5 in. studs and the 3 in. flange nuts. They are tightened until just snug. Then the evenly spaced adjusting bolts 17 going through main alignment plate 9 are used for getting the latter alignment plate on center. The milling machine clamps are then tightened down.

In some cases, an adapter plate 11 is used to center the alignment plate. Then 3.5 in. studs 14 and flange or hex nuts 15 are threaded into the front facing side of the jig fixture 1. They are evenly spaced about. Then three 3 in. milling machine clamps and jig fixture are clamped onto the main alignment plate 9. That plate is then machine on centered so that the jig fixture 1 fits into the recess section of the main alignment plate 9. The whole assembly is "on center" and the spindle checked for the correct measurements. Note that sleeve 3 can be moved so that the spindle can be moved axially (i.e., in and out) until it gets right to where the original spindle was. The replacement spindle can then be stitch welded in four spots; the jig fixture 1 and alignment plate 9 removed and the welding completed—resulting in the finished assembly better seen in FIG. 2.

Figure 4:
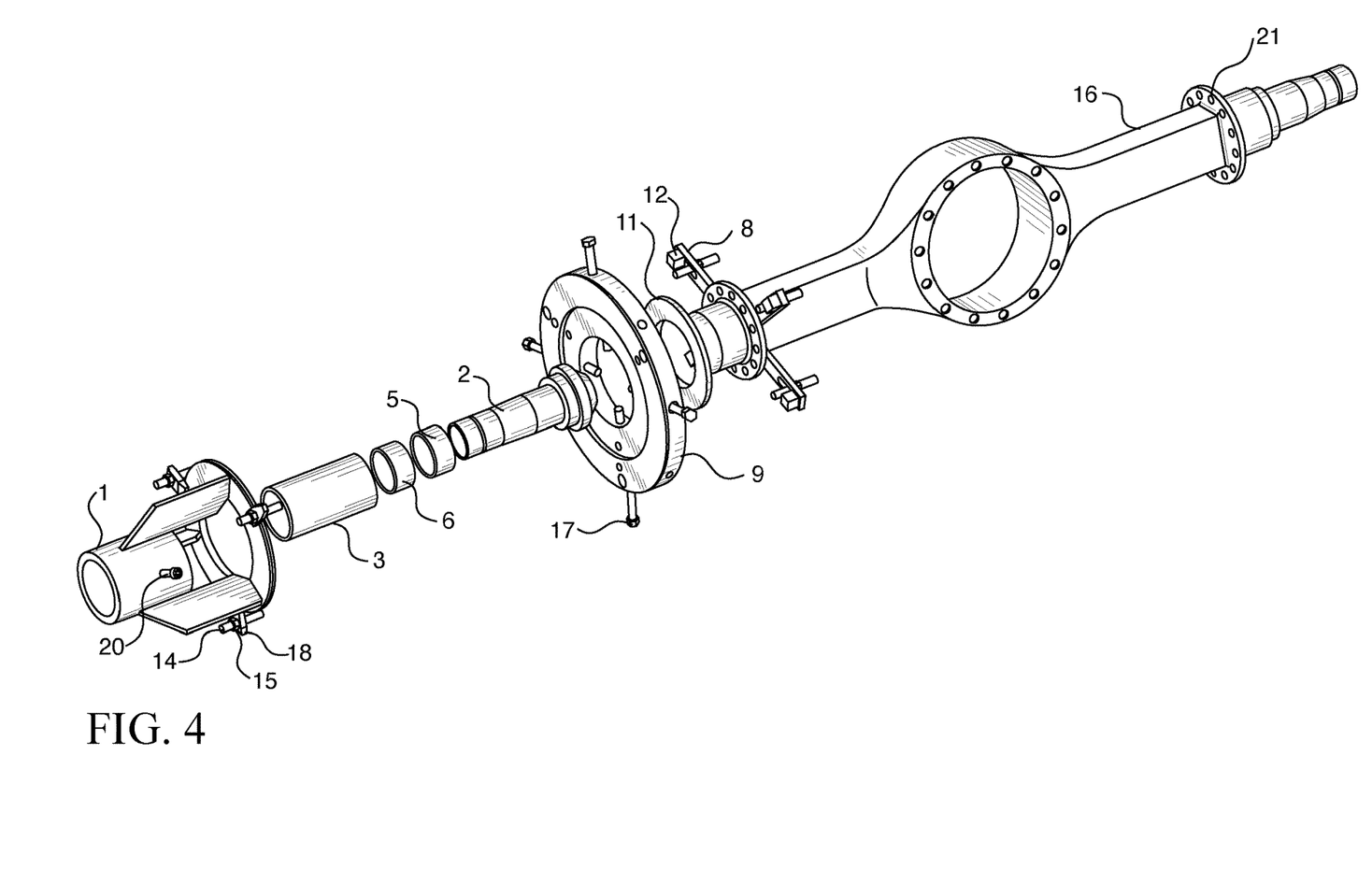
FIG. 4 is an exploded front perspective view of a drive axle jig with the rocket ship aligning tool and new adapter bushings of this invention installed onto the leftmost end of the drive axle jig for replacing per the method of this invention.
Figure 5:
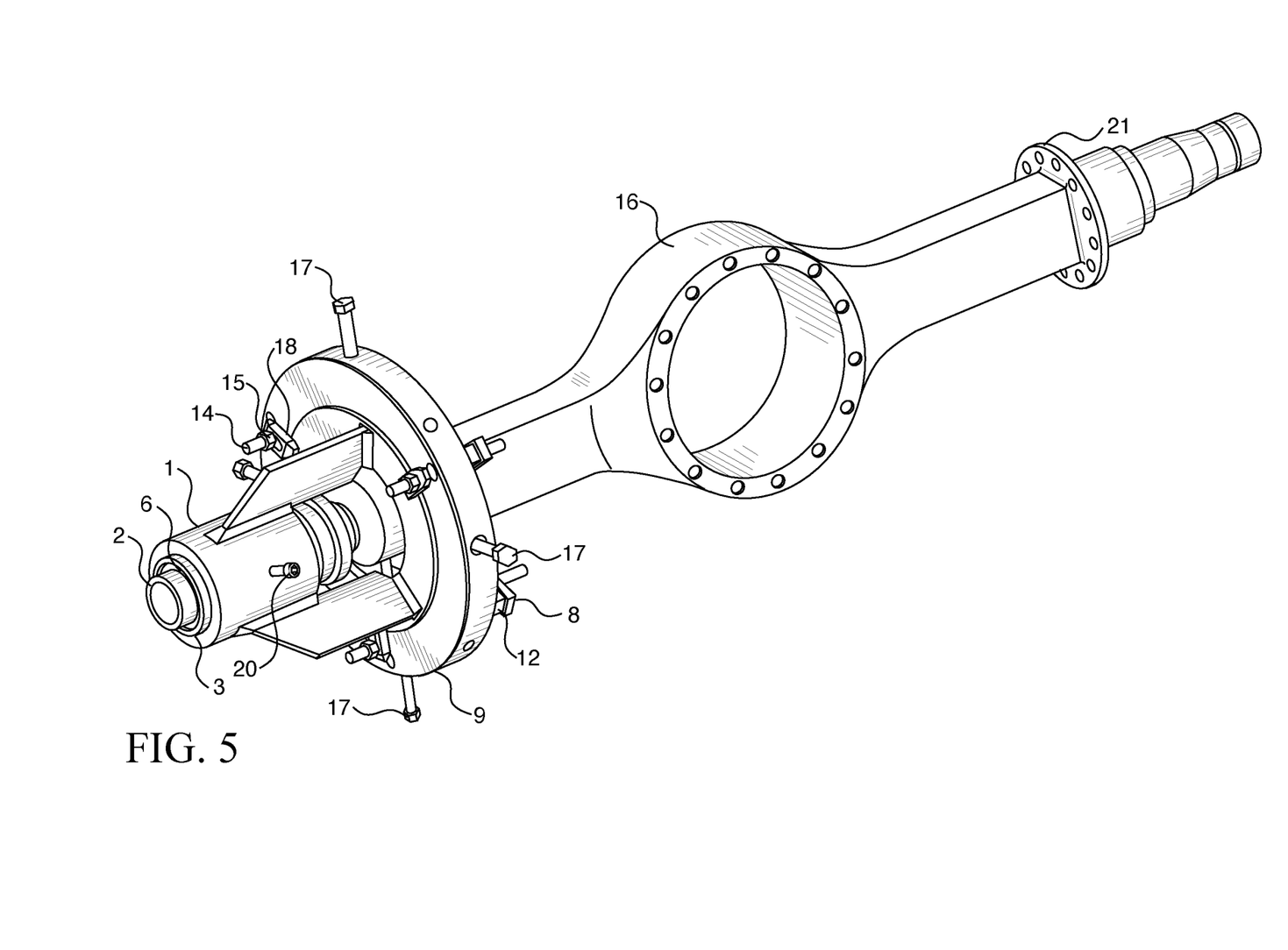
FIG. 5 is a front perspective view of the drive axle jig and rocket ship from FIG. 4 assembled altogether.
Figure 6:
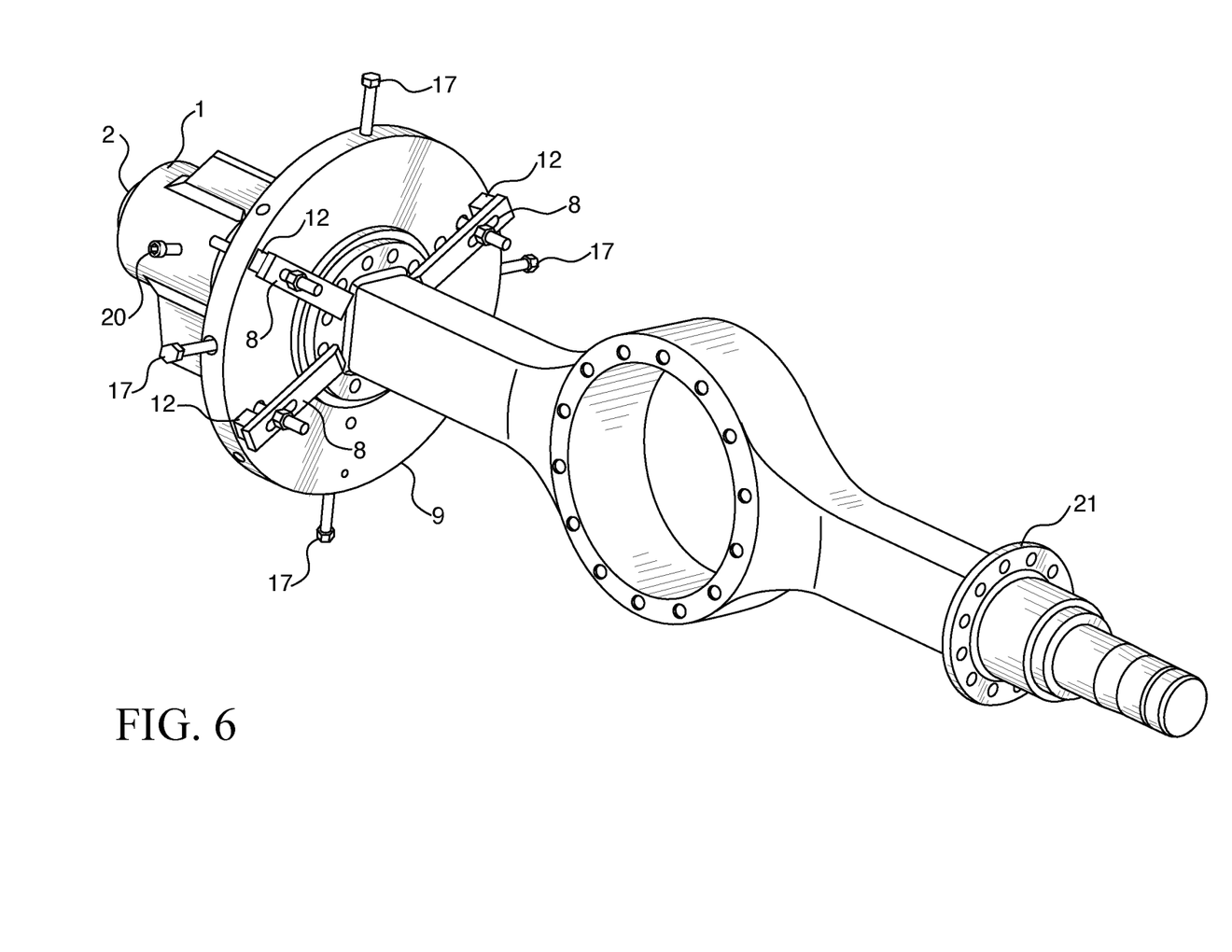
FIG. 6 is a rear perspective view of the fully assembled drive axle jig and rocket ship from the reverse angle shown in FIG. 5.

For FIGS. 4 through 6, an alignment system is shown for use in the ONSITE replacement of a truck or trailer drive axle. The respective part numbers as illustrated for this drive axle jig arrangement are as follows:

| Item No. | Quantity | Description |
| --- | --- | --- |
| 1 | 1 | ROCKET SHIP (machined for adapters for newer vehicles) |
| 2 | 1 | SPINDLE |
| 3 | 1 | SLEEVE |
| 5 | 1 | JOURNAL ADAPTER SLEEVE |
| 6 | 1 | JOURNAL ADAPTER SLEEVE |
| 8 | 4 | SLOTTED MILLING MACHINE CLAMP |
| 9 | 1 | FULL SPINDLE ALIGNMENT PLATE (welded to fit newer vehicles) |
| 10 | 4 | WASHER |
| 11 | 1 | ADAPTER PLATE |
| 12 | 4 | SPACER |
| 14 | 7 | HOLD DOWN STUD |
| 15 | 7 | HEX NUT |
| 16 | 1 | EXISTING DRIVE AXLE |
| 17 | 4 | ADJUSTING STUD |
| 18 | 3 | MACHINE CLAMP |
| 20 | 1 | CAP/SET SCREW SPINDLE BRAKE |
| 21 | 1 | DRIVE AXLE MACHINED FLANGE |

Figure 7:
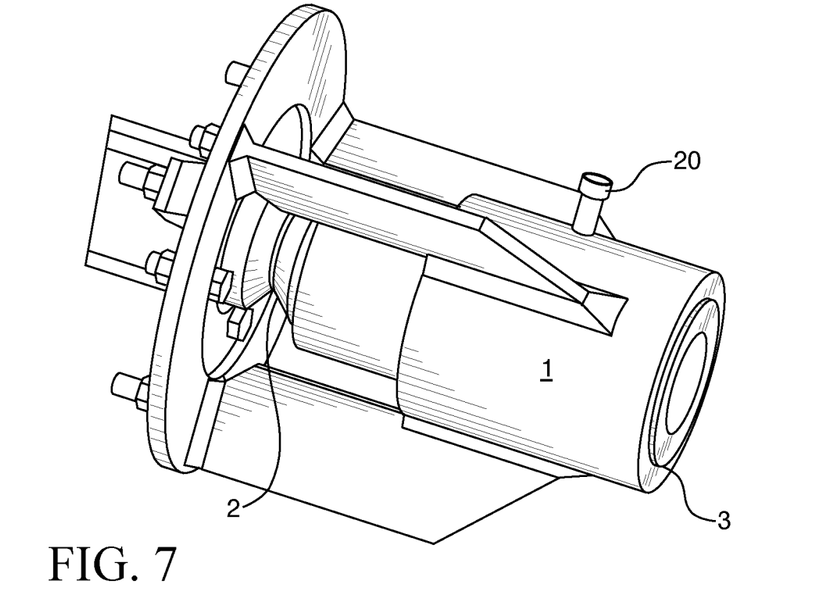
FIG. 7 is a front perspective view of a rocket ship set up for replacing a small truck axle according to this invention.
Figure 8:
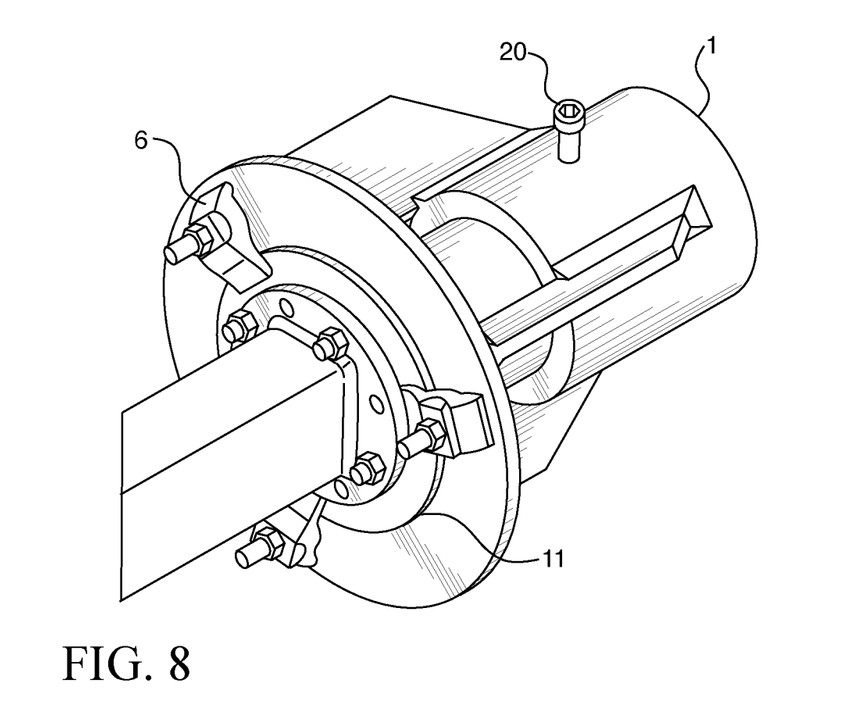
FIG. 8 is an interior perspective view of the rocket ship from the reverse angle shown in FIG. 7.

For FIGS. 7 and 8, an alignment system is shown for use in the repair of a small truck (i.e., ¾ ton or less) axle. The respective part numbers as illustrated for this axle jig arrangement are as follows:

| Item No. | Quantity | Description |
| --- | --- | --- |
| 1 | 1 | ROCKET SHIP |
| 2 | 1 | SPINDLE |
| 3 | 1 | SLEEVE |
| 6 | 1 | JOURNAL ADAPTER SLEEVE |
| 11 | 1 | ADAPTER PLATE |
| 20 | 1 | SPINDLE BRAKE SET SCREW |

Gauges may be used in the case of bearing surfaces that are set at some angle with respect to the axle axis for introducing a desired amount of camber to the wheels. In this case, the sighting bores are correspondingly rotated amounts equal to the camber before carrying out the sighting.

In a telephone call with Examiner Patel during prosecution of the parent case, application Ser. No. 15/219,181, the inventor discussed how his earlier claims were far removed from anything remotely related to pipes, pipe clamping and/or pipe cutting. The replacement of the drive and trailer axles, especially on a work site, has nothing to do with pipes per se. This invention is truly unique, however, in that it enables a single individual (without assistance from another repair person) to do the necessary gauging of replacement parts to the remainder of an axle without having to walk around, back and forth, making repeated measurements with a locator stick before performing the necessary welding of the replacement components to the axle proper. It is both a time AND manpower savings. With the pivotal adjustments of the adapter plates, rocket ships, spacers, elongated bolts and the like of this invention, it is possible to make better camber and toe measurements from the start.

Sequence Listing.

Not applicable.

Having described the best modes currently known for practicing this axle replacement system and method, it is to be understood that the scope of this invention may be further described by the attached claims.

The invention claimed is:

1. A system for enabling one individual, unassisted, to properly align full floating, replacement tubular rear spindle on an existing truck and trailer axle for welding without having to machine away any portion of the replacement tubular rear spindle, said system comprising:
   (a) an existing truck and trailer axle having a damaged rear spindle that needs replacing, said damaged rear spindle adapted for removal by cutting away from the truck and trailer axle, a remaining cut edge to the truck and trailer axle to be beveled for connecting to the replacement tubular rear spindle;
   (b) a first alignment plate for positioning on and about at least some of the beveled cut edge of the truck and trailer axle with a plurality of spaced outrigger assembly clamps and a plurality of hold down fixture clamps said first alignment plate allowing for three-dimensional, both up and down and back and forth, full axial rotation of the replacement tubular rear spindle relative to the beveled cut edge of the truck and trailer axle before welding;

(c) a first measuring plate for situating adjacent the first alignment plate;

(d) a plurality of axial spacer sleeves for positioning on a far end of the replacement tubular rear spindle, said plurality of spacer sleeves each having an inside diameter that corresponds with an outside diameter of the far end of the replacement rear spindle;

(e) a rocket ship jig having a recessed inner plate for positioning over the plurality of axial spacer sleeves and the replacement tubular rear spindle before being secured in a first position with a plurality of spaced apart hold down studs and hex nuts, said rocket ship jig also having at least one axial brake bolt for locking the rocket ship jig in place before welding;

(f) a plurality of journal adapter sleeves for positioning on an edge of the truck and trailer axle opposite the beveled cut edge to which the replacement rear spindle will be positioned and welded; and (g) a second measuring plate for situating over the plurality of journal adapter sleeves for accurately aligning with the adjacent first measuring plate and the replacement tubular rear spindle for squaring up before welding.

2. The system of claim 1, which is adapted for use at an off site, roadside location.

3. A system for enabling one person alone to align and replace a full floating, tubular rear spindle on an existing truck drive axle for welding without having to machine away any portion of the full floating, tubular rear spindle for the existing truck drive axle, said system comprising:

(a) an existing truck drive axle having a damaged rear spindle that needs replacing rather than repairing, said damaged rear spindle adapted for removal by cutting away from the truck drive axle, a remaining cut edge to the truck drive axle being beveled for connecting to the replacement tubular rear spindle;

(b) a slotted milling machine clamp;

(c) an adapter plate for positioning on and about the beveled cut edge of the truck drive axle, said adapter plate being self-aligning when positioned onto or adjacent one or more front adapter plate sleeves;

(d) a plurality of axial spacer sleeves for positioning on a far end of the replacement rear spindle, each of said plurality of spacer sleeves having an inside diameter that corresponds with an outside diameter of the replacement tubular rear spindle; and (e) a rocket ship jig having a recessed inner plate for positioning over the plurality of axial spacer sleeves and the replacement rear spindle before being secured in a first position with a plurality of spaced apart hold down studs and hex nuts, said rocket ship jig also having at least one brake bolt on one of said axial spacer sleeves for locking into place before welding.

4. The system of claim 3, which further includes:

(f) a full spindle aligning plate having a plurality of adjusting studs that allow for both up and down and in and out axial movement to better dimensionally align the replacement tubular rear spindle to the beveled cut edge of the truck drive axle before locking in place and welding.

5. The system of claim 4 wherein the full spindle aligning plate and the rocket ship jig align automatically upon placement next to one another.

6. The system of claim 3, which is adapted for use at an off site, roadside location.

7. A method for making an off site, roadside replacement of a full floating, tubular spindle for welding to an existing, damaged truck trailer axle, said method comprising the steps of:

(a) cutting away a damaged spindle from the truck trailer axle;

(b) beveling an end for connecting to the full floating, tubular spindle;

(c) attaching an alignment apparatus to the cut and beveled end of the truck trailer axle, said alignment apparatus including:

(i) a first alignment plate for positioning about the beveled cut end of the truck trailer axle with a plurality of spaced outrigger assembly bolts and center bolts, said first alignment plate allowing for three-dimensional, axial rotation of the replacement tubular spindle relative to the beveled cut end of the truck trailer axle before welding;

(ii) a first measuring plate for situating adjacent the first alignment plate;

(iii) a plurality of axial spacer sleeves for positioning on a far end of the replacement tubular spindle, each of said plurality of spacer sleeves having an inside diameter that corresponds with an outside diameter of the far end of the replacement tubular spindle;

(iv) a rocket ship jig having a recessed inner plate for positioning over the plurality of axial spacer sleeves and the replacement tubular spindle before being secured in a first position with a plurality of spaced apart hold down studs and hex nuts, said rocket ship jig also having at least one brake bolt;

(v) a plurality of journal adapter sleeves for positioning on an end of the truck trailer axle opposite the beveled cut end to which the replacement tubular spindle will be positioned and welded; and (vi) a second measuring plate for situating over the plurality of journal adapter sleeves for accurately aligning with the first measuring plate and the replacement tubular spindle adjacent thereto for measuring camber and toe before welding;

(d) checking all measurements on the alignment apparatus and adjusting clamps on the rocket ship jig to set camber and toe;

(e) stitch welding the replacement spindle onto the beveled cut end of the truck trailer axle;

(f) removing the alignment apparatus; and (g) finish welding the replacement tubular spindle to the beveled end of the truck trailer axle.

8. The method of claim 7 wherein the first measuring plate extends at least partially beyond the first alignment plate.

9. The method of claim 7 wherein the rocket ship jig fits in a recess in the first alignment plate.

* * * * *